Feb. 28, 1928. 1,660,313
F. W. AXTELL
LUBRICATING DEVICE FOR WINDMILLS
Filed May 2, 1922   2 Sheets-Sheet 2
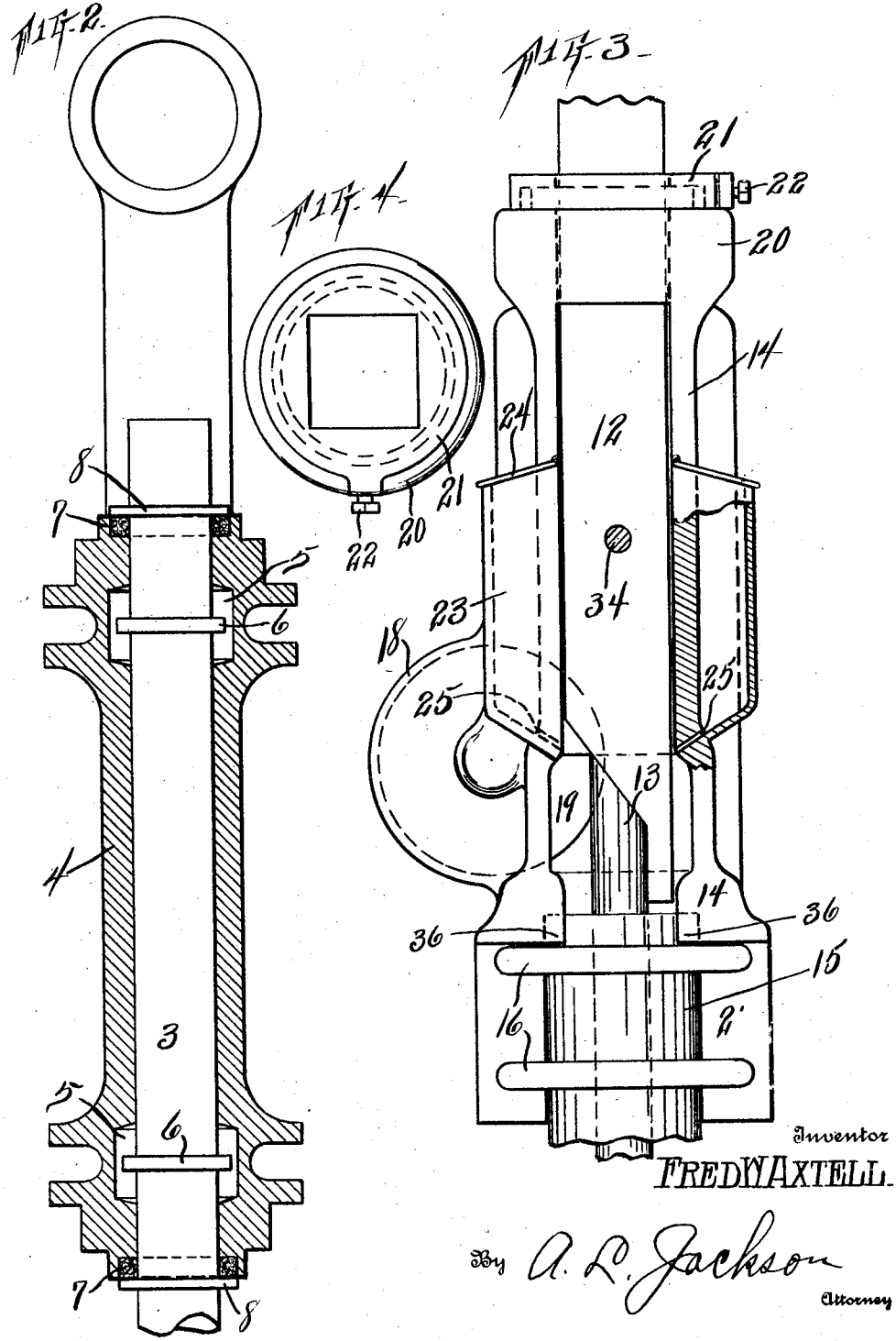
Inventor
FRED W AXTELL
By A. L. Jackson
Attorney Patented Feb. 28, 1928.

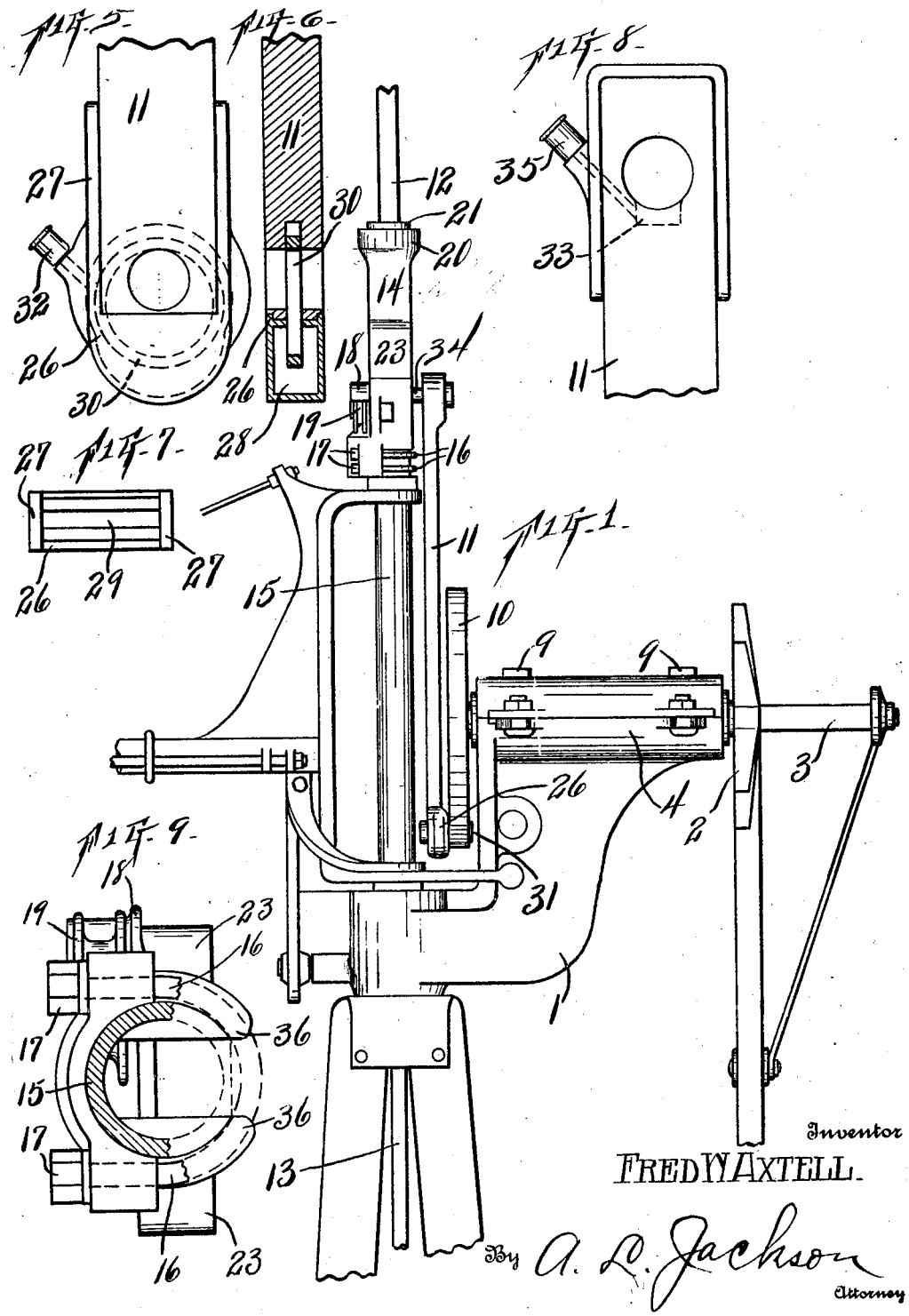

1,660,313

UNITED STATES PATENT OFFICE.

FRED W. AXTELL, OF FORT WORTH, TEXAS.

LUBRICATING DEVICE FOR WINDMILLS.

Application filed May 2, 1922. Serial No. 557,973.

My invention relates to frames for windmills and the like and more particularly to frames provided with means for automatic lubrication of the working parts; and the object is to provide certain working parts of frames for windmills and pump jacks and the like with improvements for making the installation easily and quickly accomplished and to provide certain parts with reservoirs for lubricants whereby the parts may be automatically lubricated and to provide devices which will contain enough lubricant to be fed to the working parts for long periods of time so that there will not be so much loss of time with the lubrication and which will avoid the frequent climbing of windmill towers for replenishing the lubricant. Other objects and advantages will be fully explained in the following description and the invention will be more particularly pointed out in the claims.

Fig. 1 is a side elevation of a portion of a windmill frame. Fig. 2 is a plan view, partly in section, of a bearing bracket. Fig. 3 is an enlarged portion of the frame, partly in section. Fig. 4 is a plan view of the guide frame. Fig. 5 is a detail view of the pitman rod. Fig. 6 is a vertical section of the same. Fig. 7 is a plan view of the lubricating attachment. Fig. 8 is an enlarged detail view of the upper end of the pitman rod. Fig. 9 is a bottom plan view of the upper guide frame, showing position of the U-bolts and the pipe.

Similar characters of reference are used to indicate the same parts throughout the several views.

Only such parts of the windmill frame, as involve the improvements, will be described. The bracket 1 supports the windwheel 2 which is mounted on the shaft 3. The bracket 1 is provided with a bearing 4 in two parts for the shaft 3. The bracket 1 has oil or lubricant reservoirs 5 formed in the casting thereof and rings 6 are loosely mounted on the shaft 3 for dipping into the lubricant. Felt washers 7 are mounted in cavities in the ends of the bearing 4. The washers 7 may be inclosed by washers 8 or other devices. The lubricant may be placed in the reservoirs 5 through receiving nozzles or cups 9.

A power transmitting wheel or pulley 10 is rigid with the shaft 3 and a pitman rod 11 is pivotally connected to the wheel 10. The pitman rod 11 is pivotally connected to the guide member 12 of the piston rod 13. The guide piston member 12 and piston rod 13 are vertically reciprocated by the pitman rod 11. The member 12 is reciprocated in the upper or guide frame 14. The piston rod 13 reciprocates vertically in the pipe 15 which is rigid with the windmill frame and bearing bracket 1. The guide frame 14 is clamped on the upper end of the pipe 15 by U-bolts and nuts 17. The casting of the frame 14 has a socket to receive the upper end of the pipe 15 so that the frame 14 when clamped on the pipe 15 by the U-bolts 16 will be rigid with the pipe 15 and be held in vertical alignment with the piston rod 13. The opening between the shoulders 36 together with the use of the U-bolts 16 make it feasible to insert the guide member 12 of the piston from the bottom of the frame 14 without having to climb to the top of the windmill frame to insert the piston (composed of parts 12 and 13) through the upper end of the frame 14. The frame 14 is cut away and a slot is formed for the insertion of the guide member 12, and the cutting away of the frame permits the guide member 14 to move vertically or in vertical alignment with the part 13 of the piston rod. The slot is formed between the shoulders 36 and the shoulders 36 serve to make the frame 14 rigid with the pipe 15. The guide member 12 of the piston, being enlarged relative to the part 13 of the piston, moves vertically in the slot in the bottom part of the frame 14. The frame 14 has an oil cup and packing box 20 formed in the upper end and a perforated cap 21 is attached rigidly thereto by a set screw or other means for covering the oil cup and preventing the removal of the packing box 20. The cap 21 has a square opening therethrough for the guide member 12 which is square in cross-section. The parts 12 and 13 of the piston may be welded together or otherwise rigidly attached together. The upper part of the guide member 12 will be automatically lubricated during operation. Oil or lubricant reservoirs 23 are formed on the sides of the guide frame 14 and provided with covers 24. Ducts 25 are made in the lower parts of the reservoirs 23 for lubricating the guide member 12 on the sides thereof and on the lower end. Cup 20 and the reservoirs 23 contain supplies of lubricant for lasting over long periods of time.

Provision is made for lubricating the connections of the pitman rod 11 with the wheel or disk 10 and with the guide member 12. A cap 26 is attached to the lower end of the pitman rod 11 by means of the arms 27 and a reservoir 28 is formed in the lower end of the cap 26. A slot 29 is formed in the upper side of the reservoir 28 and a ring 30 is loosely mounted on the wrist pin 31 of the pitman rod and dips in the reservoir 28 through the slot 29 for lubricating the wrist pin. The pitman rod 11 projects slightly down into the cap 26, as shown in Fig. 6. The lubricant is placed in the reservoir 28 through a cup 32. The upper end of the pitman 11 is also automatically lubricated. A cavity 33 is formed in the pitman rod below the wrist or stud pin 34 and a lubricant is placed in the reservoir 33 through a cup 35 and a duct leading from the cup 35 to the cavity 33.

What I claim, is,—

1. In a windmill frame having a bearing bracket mounted thereon for a windwheel and a shaft for said wheel journaled in said bracket, and a power transmitting wheel rigid with said shaft; a hollow cylindrical frame member rigid with said bracket, a guide frame provided with a slot in one side and provided with a socket for receiving the upper end of said cylindrical member, means for clamping said guide frame on said cylindrical member, a lubrication receptacle rigid with said guide frame, a piston rod reciprocating vertically in said frame members, and a driving pitman rod pivotally connected to said piston rod and to said power wheel, said lubrication member having ducts for delivering lubricant to said piston rod.

2. In a windmill frame having a hollow cylindrical member rigid therewith; a guide frame member rigid therewith and forming a guide for a piston rod having an opening therethrough square in cross-section and a socket in the lower end for receiving the upper end of said cylindrical member, means for clamping said guide member on said cylindrical member, a square guide rod reciprocating in said guide frame member, and means for lubricating said piston rod consisting of reservoirs formed on the sides of said guide member and having communication with the opening through said guide member.

3. In a windmill frame having a hollow cylindrical member rigid therewith; a guide frame member having an opening therethrough square in cross-section and a socket in the lower end for receiving the upper end of said cylindrical member, means for clamping said guide member on said cylindrical member, a piston rod reciprocating in said frame members, and means for lubricating said piston automatically consisting of reservoirs formed on the sides of said guide frame member and having communication with the opening therethrough and an oil cup and packing box formed in the upper end of said guide frame and cap attached to said cup and packing box for conserving the packing and lubricant therein.

4. A windmill frame having a vertically reciprocating piston rod, a power transmitting wheel, a pitman rod, a wristpin connecting said pitman rod to said wheel and a stud pin connecting said pitman rod to said piston rod, and means for automatically lubricating said wristpins consisting of a cap attached to the lower end of said pitman rod and provided with a reservoir therein and a slot in the upper side of the reservoir and ring loosely mounted on the wristpin and dipping in said reservoir and a reservoir formed in the upper end of said pitman rod under the stud pin and means for filling said reservoirs with lubricating material.

In testimony whereof, I set my hand, this 15th day of April, 1922.

FRED W. AXTELL.